United States Patent [19]

Leca et al.

[11] Patent Number: 5,047,199

[45] Date of Patent: Sep. 10, 1991

[54] GASKET FOR AND METHOD OF CASTING POLYMER PLATES

[75] Inventors: Jean-Paul Leca, Mantes La Jolie; Jean-Yves Barbin, Etrepagny, both of France

[73] Assignee: Norsolor, France

[21] Appl. No.: 265,847

[22] PCT Filed: Jan. 28, 1988

[86] PCT No.: PCT/FR88/00049

§ 371 Date: Nov. 25, 1988

§ 102(e) Date: Nov. 25, 1988

[87] PCT Pub. No.: WO88/05718

PCT Pub. Date: Aug. 11, 1988

[30] Foreign Application Priority Data

Jan. 29, 1987 [FR] France .................. 87 01049

[51] Int. Cl.$^5$ .................. B29C 33/00; B29C 39/40
[52] U.S. Cl. .................. 264/316; 249/82; 249/114.1; 249/134; 249/187.1; 264/2.2; 264/216; 264/331.18; 264/337
[58] Field of Search ............ 264/216, 219, 313, 316, 264/336, 2.2, 216, 331.18, 337; 249/187.1, 82, 114.1, 134

[56] References Cited

U.S. PATENT DOCUMENTS

| | | | |
|---|---|---|---|
| 2,328,525 | 8/1943 | Egolf | 264/331.18 |
| 2,390,129 | 12/1945 | Shobert | 249/82 |
| 2,848,753 | 8/1958 | Anspon et al. | 264/316 |
| 3,639,553 | 2/1972 | Sueda et al. | 264/313 |
| 3,872,197 | 3/1975 | Kato et al. | 264/216 |
| 4,089,918 | 5/1978 | Kato et al. | 264/216 |
| 4,143,852 | 3/1979 | Wiener | 249/187.1 |
| 4,211,742 | 7/1980 | Kato et al. | 264/216 |

FOREIGN PATENT DOCUMENTS

| | | |
|---|---|---|
| 1218137 | 6/1966 | Fed. Rep. of Germany . |
| 2414057 | 8/1979 | France . |
| 206049 | 1/1984 | German Democratic Rep. . |
| 53-109556 | 9/1978 | Japan . |
| 112990 | 10/1978 | Japan .................. 264/313 |
| 56-53509 | 12/1981 | Japan . |

OTHER PUBLICATIONS

Kirk-Othmer, Encyclopedia of Chemical Technology, Third Ed., vol. 18, pp. 549, 552 and 575-579 (1982).
Kirk-Othmer, Encyclopedia of Chemical Technology, Third Ed., vol. 17, pp. 757-758 (1982).
Kirk-Othmer, Encyclopedia of Chemical Technology, Third Ed., vol. 16, pp. 456-457 (1981).
Encyclopedia of Polymer Science and Technology—Plastics, Resins, Rubbers, Fibers, vol. 8, pp. 587-620 (1968).
Properties of Polymers—Correlations with Chemical Structure, D. W. Van Krevelen, Elsevier Publ. Company, pp. 20-22 and 193 (1972).
European Search Report—06/09/88.
The Elements of Polymer Science and Engineering, Rudin, A., 1982, pp. 5 and 23.
Rogets International Thesaurus, 4 ed., 1977, p. 127.
Webster's New Collegiate Dictionary, 1973, p. 521.

*Primary Examiner*—James Lowe
*Attorney, Agent, or Firm*—Finnegan, Henderson, Farabow, Garrett & Dunner

[57] ABSTRACT

Gasket used in a fabrication method, wherein a methylmethacrylate prepolymer or a mixture of unsaturated monomers, whose main constituent is methylmethacrylate, or the unsaturated monomer or monomers themselves is (are) introduced into a mold comprised of two parallel plates separated by said gasket, and the mold is brought to a temperature sufficient to complete or carry out the polymerization. The gasket consists of a core of plasticized poly(vinylchloride), said core being sheathed by a thin layer of thermoplastic polymers chosen from among propylene polymers and saturated polymers, said thermoplastic polymer being capable of retaining its elasticity at temperatures ranging from 20° to 120° C. and having a melting or softening point higher than 115° C.

10 Claims, No Drawings

GASKET FOR AND METHOD OF CASTING POLYMER PLATES

The present invention relates to a hank (which can also be referred to as a gasket) that can be used for the manufacture of polymer plates or sheets, such as, for example, acrylic polymers, by casting. More particularly, the present invention relates to a hank making up the component that provides a tight seal between the two plates between which the methylmethacrylate prepolymer "syrup" or the pure monomer is poured in order to complete or carry out the polymerization by raising the temperature, resulting in the production of cast sheets of poly(methyl methacrylate). These cast sheets form, for example, colored transparent plates that have a wide practical application, notably for making advertising signs.

To manufacture sheets of poly(methyl methacrylate), one usually starts by preparing a "syrup" of methylmethacrylate prepolymer in a reactor under agitation and with a controlled temperature until a conversion of 5-10% is achieved. After degassing the "syrup" to prevent the formation of air bubbles in the cast sheets thus formed, this "syrup" is poured in molds comprised of two flat glass plates separated by a peripheral hank, the plates being held in place by clamps for closing the mold. Once the hank has been positioned mechanically between the plates, the clamps are placed on three sides; the "syrup" is introduced through a pipe on the fourth side of the mold; after filling, the missing clamps are set in place, the air is expelled from the mold, and the latter is placed in an oven to complete polymerization.

During the methylmethacrylate polymerization cycle, the mold undergoes changes in volume due to variations in the density of the reaction mixture with the temperature and the degree of polymerization. Such changes in volume are partially borne by the hank.

The table below shows the density of the mixture to be polymerized at the different stages of polymerization and, based on certain working hypotheses, the resulting thickness of the hank, its thickness at the start of polymerization being rated as 1.

In order for the hank to be able to provide a tight seal for the mold during the rise in temperature to 60° C., it must first be placed under stress and the elastic crushing to which it is subjected must be sufficient for it to be able to relax from 1 to 1.046.

Therefore, the nominal diameter of the hank, for a final plate thickness of 0.85, must be 1.046. Actually, such a diameter must be greater than this size in order to account for the following parameters: change in thickness of the hank; partial creep of the hank; reduction in the elastic forces that provide tightness for the mold during the temperature rise to 60° C.; change in the filling volume and change in the positioning of the hank. To take these parameters into account, it has been calculated that the diameter of the hank must be 1.09 or more, which gives a "shimming coefficient" of 1.09/0.85, or 1.28.

In practice, "shimming coefficients" are determined experimentally for each thickness of sheet, the values chosen being those that will produce sheets that are by nature free of flaws, but above all that will give the most uniform thickness profile; the closing force of the clamps is also considered when calculating this coefficient. This closing force must also be taken into account when choosing the hardness of the material from which the hank will be made.

Plasticized poly(vinyl chloride) hanks meet all these requirements: providing a tight seal for the mold, having an adjustable diameter, an adjustable hardness, flexibility, weldability, as well as being easy to work with.

However, such hanks have the disadvantage of allowing themselves to be swollen by methyl methacrylate. The result is that after the mold has been stripped, the hank will remain integral with the sheet of poly(methyl methacrylate) and the cutting (or trimming) of the edges of the resulting sheet will lead to trimming scraps that cannot be recovered because of the physiochemical adherence of the hank to the poly(methacrylate) and because the thermal cracking of these scraps would produce chlorine that would cause serious problems to the installation and to the environment.

The same difficulties arise when the plates are made of a material that includes methyl methacrylate as the principal constituent and at least one other monomer that can be polymerized simultaneously. This is especially the case with plates made up of networks interpenetrated by poly(methyl methacrylate) and another polymer such as polyurethane or polydimethylsiloxane.

The present invention provides a solution for the above problems by proposing hanks that can be removed after polymerization, so that all polymer scraps can thereafter be regenerated.

Therefore, the object of the present invention is, first, a hank for fabricating polymer plates by casting, wherein a methylmethacrylate prepolymer or a mixture of unsaturated monomers, whose main constituent is methyl methacrylate, or the unsaturated monomer or monomers themselves is (are) introduced into a mold comprised of two parallel plates separated by said hank, and the mold is brought to a temperature sufficient to complete or carry out the polymerization, characterized in that said hank is made up of a core of plasticized poly(vinyl chloride), said core being sheathed by a thin layer of thermoplastic polymer chosen from among propylene polymers and saturated polyesters, said thermoplastic polymer being capable of retaining its elasticity at temperatures ranging from about 20° to 120° C. and having a melting or softening point higher than about 115° C.

Preferably, the hank incorporating the present invention is obtained by coextrusion of the plasticized poly(vinyl chloride) core and the outer thermoplastic polymer sheath.

The polypropylene polymers that can be used are isotactic homopolymers obtained by homopolymerization of propylene in the presence of Ziegler-type catalysts or copolymers containing at least about 90% of moles of patterns derived from propylene and at most about 10% of moles of patterns derived from ethylene and/or at least one alpha-olefin having between 4 and 12 carbon atoms.

As for the saturated polyester that can form the outer sheath of the hank, it is chosen especially from among poly(ethylene terephthalates) (PETP) and poly(butylene terephthalates) (PBTP). It is important that the thermoplastic polymer (a polypropylene polymer or a saturated polyester) forming the sheath be an essentially crystalline polymer rather than an elastomeric kind of polymer.

The plasticized poly(vinyl chloride) forming the core of the hank is obtained by incorporation into the poly(vinyl chloride) of at least one plasticizer and, if need be, at least one conventional additive chosen from among stabilizers and lubricants; the plasticizer or plasticizers generally account for about 15 to 60% by weight of the total mixture.

Pursuant to other important characteristics of the hank incorporating the invention, it has a nominal thickness ranging especially from 1 to 40 mm, for a final thickness of the sheet of poly(methyl methacrylate) ranging especially from 0.8 to 33 mm; the outer sheath has a thickness ranging in particular from 0.1 to 1 mm; and the hank has a Shore hardness A ranging especially from about 60 to 100.

The hank embodying the invention has in a conventional manner a circular or ellipsoidal cross section or consists of a body with a rectangular cross section, extended on one of its sides by a perpendicular tongue intended to provide support to said hank on the bottom plate of the mold.

Pursuant to a particularly interesting characteristic of the hank constituting the subject of the present invention has perforations spaced apart from one another along a generatrix and made in the outer sheath in such a way as to form fastening points for said hank on the poly(methyl methacrylate) sheet, once polymerization is completed. Said perforations can be made with or without removal of material, for example, by means of a drill.

The thusly formed hank is assembled such as to form a crown having the length of the perimeter of the fabricated plate.

This assembly can be done in two ways, either by mirror welding or, more conveniently, by using sleeves that can be retracted by hot air of the type used for protecting electrical wire connections, made of a material compatible with the other materials employed, such as poly(vinyl chloride) or polyethylene.

Under these conditions, during polymerization, the poly(methyl methacrylate) gets into these perforations in the hank, so that, when the mold is stripped, the hank remains fastened to the edges of the sheet which can thereafter be handled much more easily than if the hank had become separated directly from the latter. This is due to the fact that such sheets have cutting edges, which means that they have to be handled with special precautions.

A further object of the present invention is a process for fabricating polymer plates by casting, wherein a methylmethacrylate prepolymer or a mixture of unsaturated monomers, whose principal constituent is methyl methacrylate, or said unsaturated monomer or monomers themselves is (are) introduced into a mold comprised of two parallel plates separated by a hank, and the mold is brought to a temperature sufficient to complete or carry out the polymerization, characterized in that a hank as defined above is used.

In order that the invention may be better understood, a particular embodiment will be described hereinbelow.

EXAMPLE

The following poly(vinyl chloride) formulation is prepared:

| | |
|---|---|
| Poly(vinyl) chloride | 10 parts by weight |
| Dioctyl phthalate (plasticizer) | 48 parts by weight |
| Lubricants | 6 parts by weight |
| Stabilizer | 0.3 parts by weight |

The above formulation and polypropylene are coextruded to produce a poly(vinyl chloride) hank sheathed with polypropylene, whose overall diameter is 11 mm, the thickness of the sheath being 0.2 mm. This hank has a Shore hardness A of 85. Along a generatrix on said hank, a series of cross-shaped perforations of approximately 2 mm in length have been made throughout the thickness of the sheath and are spaced about 10 cm apart.

A poly(methyl methacrylate) sheet of 3 m × 2 m × 8 mm was then made: in a mold comprised of two parallel glass plates separated by said hank which has been placed so that the perforations are situated in the medium plane of the mold, toward the inside of the latter, a "syrup" of methylmethacrylate prepolymer containing a benzoyl peroxide as a polymerization primer has been poured. The polymerization of the sheet is carried out in a ventilated oven heated to a temperature of 50° C. for about 18 hours, and for 1 hour and 30 minutes at 113° C. The mold was then taken out of the oven and the sheet of poly(methyl methacrylate), to which the hank remained attached by the fastening points made up of the polymer formed in the above-mentioned perforations, was stripped.

The hank could thereafter be torn off easily, so that the poly(methyl methacrylate) (PMMA) sheet obtained, free of any bank residue, could be cut as desired. The sheet of PMMA that was obtained could also be handled safety without immediately removing the hank.

TABLE

| Stage of polymerization cycle | (1) MMA* at 20° C. | (2) MMA at 60° C. (polymerization temperature) | (3) PMMA** at 60° C. (MMA almost completely polymerized) | (4) PMMA at 110° C. (post-polymerization) | (5) PMMA at 20° C. (before removal from mold) |
|---|---|---|---|---|---|
| Density of reaction mixture | 0.952 | 0.910 | 1.165 | 1.15 | 1.18 |
| Calculation hypothesis | The hank thickness below takes into account the crushing produced by the mold's closing clamps | The change in volume is embodied by a change in thickness | The contraction of volume is assumed to be induced by a surface contraction of about 3% and of 97% in thickness | The expansion is assumed to take place uniformly in all three dimensions | The contraction is assumed to take place uniformly in all three dimensions |
| Thickness of the hank between the two plates | 1 | 1.046 | 0.85 | 0.85 | 0.85 |

*MMA = Methyl methacrylate
**PMMA = Poly(methyl methacrylate)

We claim:

1. A gasket for fabricating methyl methacrylate polymer plates by casting comprising a core of plasticized poly(vinyl chloride), said core being sheathed by a thin layer of thermoplastic polymer selected from the group consisting of propylene polymers and saturated polyesters, said thermoplastic polymer being capable of keeping its elasticity at temperatures ranging from 20° to 120° C. and having a melting or softening point higher than about 115° C.

2. The gasket according to claim 1, wherein it is obtained by coextrusion of the plasticized poly(vinyl chloride) core and the outer thermoplastic polymer sheath.

3. The gasket according to claim 1 or 2, whose outer sheath is composed of a saturated polyester, wherein said polyester is selected from the group consisting of poly(ethylene terephthalates) and poly(butylene terephthalates).

4. The gasket according to claim 1, wherein the plasticized poly(vinylchloride) is obtained by incorporation into the poly(vinylchloride) of at least one plasticizer or at least one plasticizer and at least one conventional additive selected from among stabilizers and lubricants, the plasticizer or plasticizers generally accounting for about 15 to 60% by weight of the total mixture.

5. The gasket according to claim 1, wherein it has a nominal thickness ranging from 1 to 40 mm.

6. The gasket according to claim 1, wherein the outer sheath has a thickness ranging from 0.1 to 1 mm.

7. The gasket according to claim 1, wherein it has a Shore hardness ranging from 60 to 100.

8. The gasket according to claim 1, wherein it has a circular or ellipsoidal cross section or consists of a body with a rectangular cross section, extended one of its sides by a perpendicular tongue intended to provide support to said gasket on the bottom plate of the mold.

9. The gasket according to any claim 1, wherein it has, along a generatrix, perforations spaced apart from one another and made throughout the thickness of the outer sheath so as to form fastening points for said gasket on the poly(methylmethacrylate) sheet, once polymerization is completed.

10. A process for fabricating polymer plates by casting, comprising introducing a methylmethacrylate prepolymer or a mixture of unsaturated monomers, whose principal constituent is methyl methacrylate, or said unsaturated monomer or monomers themselves into a mold comprised of two parallel plates separated by a gasket, and bringing the mold to a temperature sufficient to complete or carry out the polymerization, wherein said gasket comprises a core of plasticized poly(vinyl chloride), said core being sheathed by a thin layer of thermoplastic polymer selected from the group consisting of propylene polymers and saturated polyesters, said thermoplastic polymer being capable of keeping its elasticity at temperatures ranging from 20° to 120° C. and having a melting or softening point higher than about 115° C.

* * * * *

UNITED STATES PATENT AND TRADEMARK OFFICE
CERTIFICATE OF CORRECTION

PATENT NO. : 5,047,199

DATED : September 10, 1991

INVENTOR(S) : Jean-Paul Leca et al.

It is certified that error appears in the above-identified patent and that said Letters Patent is hereby corrected as shown below:

<u>Claim 3</u>, col. 5, line 14, delete "claim" and insert --claims--.

Signed and Sealed this

Second Day of February, 1993

Attest:

STEPHEN G. KUNIN

*Attesting Officer*     *Acting Commissioner of Patents and Trademarks*

UNITED STATES PATENT AND TRADEMARK OFFICE
CERTIFICATE OF CORRECTION

PATENT NO. : 5,047,199

DATED : September 10, 1991

INVENTOR(S) : Jean-Paul Leca et al

It is certified that error appears in the above-identified patent and that said Letters Patent is hereby corrected as shown below:

Claim 9, col. 6, line 8, delete "any".

This certificate supersedes Certificate of Correction issued February 2, 1993.

Signed and Sealed this

Twenty-third Day of March, 1993

*Attest:*

STEPHEN G. KUNIN

*Attesting Officer*     Acting Commissioner of Patents and Trademarks

UNITED STATES PATENT AND TRADEMARK OFFICE
CERTIFICATE OF CORRECTION

PATENT NO. : 5,047,199
DATED : September 10, 1991
INVENTOR(S) : Jean-Paul Leca et al It is certified that error appears in the above-indentified patent and that said Letters Patent is hereby corrected as shown below:

Claim 3, col. 5, line 14, delete "claim" and insert --claims--.

Claim 9, col. 6, line 8, delete "any".

This certificate supersedes Certificate of Corrections issued February 2, 1993 and March 23, 1993.

Signed and Sealed this

Tenth Day of May, 1994

Attest:

BRUCE LEHMAN

Attesting Officer

Commissioner of Patents and Trademarks